US010363908B2

(12) United States Patent
Ishihara et al.

(10) Patent No.: US 10,363,908 B2
(45) Date of Patent: Jul. 30, 2019

(54) VEHICLE BRAKE SYSTEM

(71) Applicant: HONDA MOTOR CO., LTD., Tokyo (JP)

(72) Inventors: Keita Ishihara, Wako (JP); Toshihiro Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 15/443,239

(22) Filed: Feb. 27, 2017

(65) Prior Publication Data

US 2017/0253220 A1    Sep. 7, 2017

(30) Foreign Application Priority Data

Mar. 1, 2016    (JP) .................. 2016-039370

(51) Int. Cl.
*B60T 7/06*    (2006.01)
*B60R 21/09*    (2006.01)
(Continued)

(52) U.S. Cl.
CPC .............. *B60T 7/065* (2013.01); *B60R 21/09* (2013.01); *B60T 8/3685* (2013.01); *B60T 8/4081* (2013.01); *B60T 11/22* (2013.01); *B62D 1/197* (2013.01); *B62D 25/085* (2013.01); *B62D 25/088* (2013.01); *B62D 27/065* (2013.01); *G05G 1/32* (2013.01); *B60T 7/042* (2013.01); *B60T 11/20* (2013.01); *B60T 13/146* (2013.01); *B60T 13/662* (2013.01); *B60T 13/686* (2013.01); *B60T 13/745* (2013.01); *B60T 17/22* (2013.01);
(Continued)

(58) Field of Classification Search
CPC ..... B60T 7/065; B60R 21/09; B60Y 2306/01; G05G 1/32
See application file for complete search history.

(56) References Cited

U.S. PATENT DOCUMENTS 5,797,264 A * 8/1998 Verbo ...................... B60T 7/06
                                                        180/271
5,890,358 A    4/1999 Verbo et al.
(Continued)

FOREIGN PATENT DOCUMENTS

CN    103221278 A    7/2013
JP    H10338167 A    12/1998
(Continued)

OTHER PUBLICATIONS

Notice of Reasons of Rejection, Japanese Patent Application No. 2016-039370, dated Dec. 12, 2017, 6 pages.
First Office Action, Chinese Patent Application No. 201710118906. 7, dated Feb. 26, 2019, 6 pages.

*Primary Examiner* — Barry Gooden, Jr.
(74) *Attorney, Agent, or Firm* — Armstrong Teasdale LLP (57) ABSTRACT

A vehicle brake system comprises an input device (21) attached to a bulkhead (15) separating a power unit room and a passenger compartment of the vehicle from each other, and including a part extending into the power unit room. A free end of the part of the input device extending into the power unit room is fitted with a protective member (70) defining a slanted surface (70a) opposing the power unit and slanting rearward as one moves in a prescribed lateral direction so that the input device is protected from a frontal impact. In particular, the slanted surface aligns with a corner part (83a) of the power unit (83).

10 Claims, 8 Drawing Sheets

(51) Int. Cl.
  *G05G 1/32*    (2008.04)
  *B60T 11/22*   (2006.01)
  *B62D 1/19*    (2006.01)
  *B62D 25/08*   (2006.01)
  *B62D 27/06*   (2006.01)
  *B60T 8/36*    (2006.01)
  *B60T 8/40*    (2006.01)
  *B60T 7/04*    (2006.01)
  *B60T 13/74*   (2006.01)
  *B60T 11/20*   (2006.01)
  *B60T 13/14*   (2006.01)
  *B60T 13/66*   (2006.01)
  *B60T 13/68*   (2006.01)
  *B60T 17/22*   (2006.01)

(52) U.S. Cl.
  CPC ....... *B60T 2270/82* (2013.01); *B60Y 2306/01* (2013.01)

(56) References Cited

U.S. PATENT DOCUMENTS

| | | | | |
|---|---|---|---|---|
| 7,506,715 | B2 * | 3/2009 | Averdiek | B60T 7/065 180/232 |
| 2003/0140726 | A1 * | 7/2003 | Burgstaler | B60T 7/065 74/512 |
| 2004/0231453 | A1 * | 11/2004 | Harashima | B60R 21/09 74/560 |
| 2007/0283690 | A1 * | 12/2007 | Miller | B60R 21/09 60/547.1 |
| 2012/0118682 | A1 * | 5/2012 | Murayama | B60T 13/166 188/152 |
| 2013/0232966 | A1 * | 9/2013 | Murayama | B60T 7/042 60/545 |
| 2013/0333376 | A1 | 12/2013 | Murayama et al. | |
| 2017/0253220 | A1 * | 9/2017 | Ishihara | B60T 8/3685 |

FOREIGN PATENT DOCUMENTS

| | | |
|---|---|---|
| JP | 2000512596 A | 9/2000 |
| JP | 2012106641 A | 6/2012 |

* cited by examiner

VEHICLE BRAKE SYSTEM

TECHNICAL FIELD

The present invention relates to a vehicle brake system, and in particular to a vehicle brake system including an input device and an electric brake actuator for producing a hydraulic brake pressure which may be provided separately from each other.

PRIOR ART

In recent years, brake systems provided with an electric boosting device using an electric motor have come to be used, instead of the more conventional brake systems provided with a booster device using negative pressure or hydraulic pressure.

Such a brake system typically includes an input device from which a brake input is applied by an operator, typically via a brake pedal, and a motor cylinder device (electric brake actuator) for producing a brake pressure based on an electric signal corresponding to the applied brake input so that the overall size of the brake system is relatively great. Therefore, it was previously proposed to separately provide the input device and the electric brake actuator in the engine room of the vehicle with the aim of enhancing the freedom in the layout of the brake system. See JP2012-106641A, for instance. At the time of a frontal vehicle crash, the engine is displaced rearward, and may collide with the input device so that the input device may transmit the impact of the crash to the vehicle occupant. In the brake system proposed in this patent publication, a part of the input device located in the engine room is provided with a frangible part so that the impact of the crash may not reach beyond the bulkhead separating the engine room and the passenger compartment from each other.

However, depending on the mode of the crash (such as an oblique crash and an offset crash), the engine may not collide with the frangible part, and the impact of the crash may be transmitted to the input device.

SUMMARY OF THE INVENTION

In view of such problems of the prior art, a primary object of the present invention is to provide a vehicle brake system that can more effectively absorb the impact of crash so as to maximize the safety of the vehicle occupant.

A second object of the present invention is to provide a vehicle brake system that can offer an enhanced freedom of layout.

To achieve such objects, the present invention provides a vehicle brake system (20) comprising an input device (21) attached to a bulkhead (15) separating a power unit room (3) accommodating a power unit (5) of a vehicle and a passenger compartment (4) of the vehicle from each other, the input device including a part extending into the power unit room, wherein: a free end of the part of the input device extending into the power unit room is fitted with a protective member (70) defining a slanted surface (70a) opposing the power unit and slanting rearward as one moves in a prescribed lateral direction.

Owing to the provision of the slanted surface, at the time of a frontal crash, a rearward collision of the power unit, such as an engine, an electric motor, an electric generator, a transmission and a differential gear box, with the input device creates a lateral force to the free end of the input device so that the input device is tilted sideways, and is prevented from moving into the passenger compartment.

Preferably, the slanted surface aligns with a corner part of the power unit defined by a side end surface of the power unit extending along a fore and aft direction and a rear end surface extending in the prescribed lateral direction from the side end surface.

Thereby, the lateral force that tends to tilt the input device can be maximized, and the input device is prevented from moving into the passenger compartment in an even more effective manner.

If the corner part of the power unit is provided with a corresponding slanted surface (83a) opposing the slanted surface of the protective member, the friction between the two slanted surfaces can be minimized so that the functions of the protective member can be performed in an even more effective manner.

According to a preferred embodiment of the present invention, the protective member is made of a separate member which is attached to a main body of the input device.

Thereby, the input device is not required to be modified in any substantial way so that an increase in the manufacturing cost can be minimized. In particular, the protective member may be made of relatively inexpensive stamp formed sheet metal.

According to a particularly preferred embodiment of the present invention, the protective member is attached to the main body of the input device by a fastener (78) and an engagement feature (79) provided on the protective member in a spaced apart relationship to the fastener and engaging a part of the main body of the input device.

Thereby, the protective device can be attached to the main body of the input device at least at two points which are separated from each other so that the protective member can be attached to the main body of the input device in an efficient and secure manner. The engagement feature may consist of a tongue piece configured to be engaged by a recess or a hole formed in the input device.

Preferably, the protective member is made of a plate member including a first vertical wall (72) which is attached to the main body of the input device via a fastener, an upper horizontal wall (71) extending laterally from an upper edge of the first vertical wall away from the main body of the input device, and a second vertical wall (73) extending downward from a lateral edge of the upper horizontal wall remote from the first vertical wall, the slanted surface being formed by at least a part of the second vertical wall.

Thus, the protective member can be given with a high stiffness by using a simple and inexpensive member. It is particularly advantageous to use the engagement feature in combination with the fastener.

Preferably, a rear end of a corner part between the upper horizontal wall and the second vertical wall is provided with a cutout (76) for affording access to the fastener so that the access to the fastener may be facilitated in a highly simple manner without detracting from the stiffness of the protective member.

According to a particularly preferred embodiment of the present invention, the upper horizontal wall includes a front part that is tapered and a rear part that is substantially less tapered than the front part so that a substantially horizontal bent ridge line (75) is defined between the upper horizontal wall and the second vertical wall, and a substantially vertical linear ridge line (80) between a front part and a rear part of the second vertical wall.

Thus, the substantially horizontal bend ridge increases the stiffness of the protective member against a loading from the front so that the slanted surface is enabled to maintain the shape thereof in a reliable manner during a frontal crash.

Preferably, the first vertical wall has a substantially smaller vertical dimension than the second vertical wall.

The weight of the protective member can be minimized without detracting from the functionality of the protective member.

When an electric component (60-62) is positioned between a main body of the input device and the protective member or behind the protective member, the protective member is additionally given with the function to protect the electric component at the time of a crash.

According to a preferred embodiment of the present invention, the vehicle brake system consists of a brake by wire system having a powered brake device (22) positioned in the power unit room separately from the input device, the electric component including an electric circuit for detecting an amount of input applied to the input device.

Thereby, the layout of the brake system can be enhanced, and the associated electric circuit for the brake system can be favorably protected by the protective member.

Typically, the input device is positioned adjacent to a front damper housing (14) on a lateral side remote from the protective member.

Thus, the input device can be favorably protected jointly by the protective member and the front damper housing at the time of a crash.

According to a preferred embodiment of the present invention, the input device is laterally interposed between the front damper housing and a bulging part (15a) of the bulkhead bulging toward the power unit room and having an opening for passing through a steering shaft.

Thus, the input device can be favorably protected jointly by the protective member, the bulging part and the front damper housing at the time of a crash.

BRIEF DESCRIPTION OF THE DRAWINGS

Now the present invention is described in the following with reference to the appended drawings, in which.

DESCRIPTION OF THE PREFERRED EMBODIMENT(S)

An embodiment of the present invention is described in the following with reference to the appended drawings. In the following description, the directions are based on the view of a vehicle operator.

Figure 1:
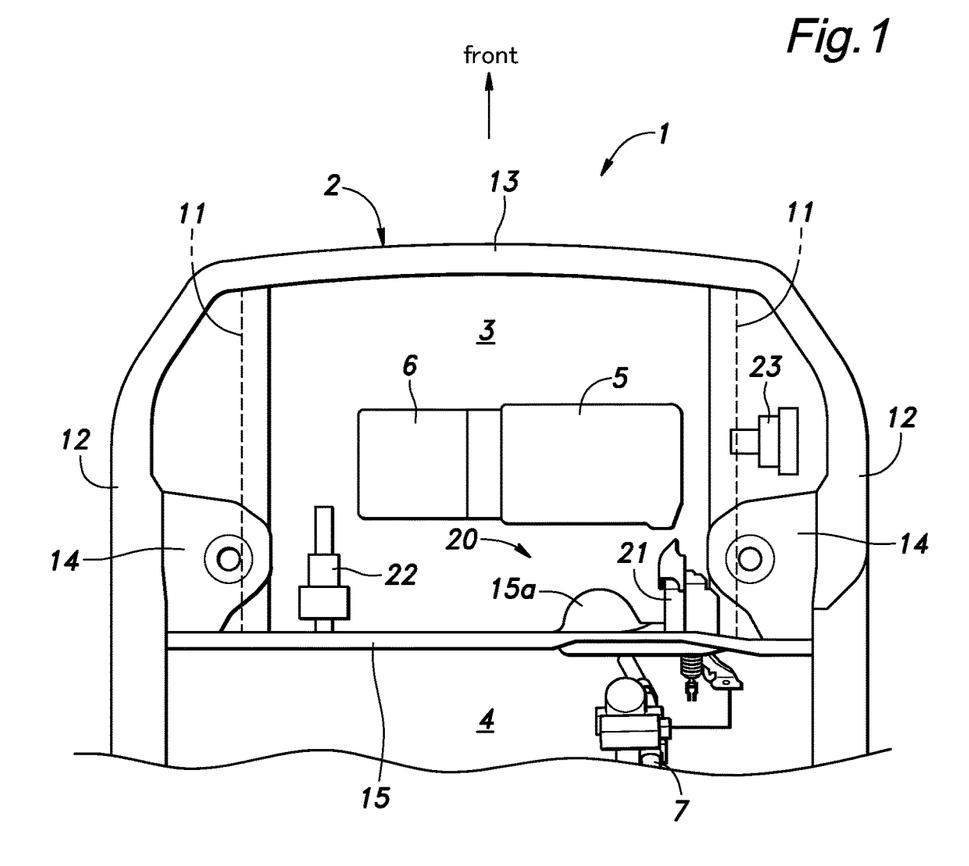
FIG. 1 is a fragmentary plan view of a front part of a vehicle provided with a vehicle brake system embodying the present invention.

FIG. 1 is a plan view of a front part of a vehicle 1 equipped with a brake system 20 embodying the present invention. The vehicle 1 in this embodiment consists of a front engine, front drive, four wheel vehicle, and the driver's seat is located on the right hand side of the vehicle 1. A front part of the vehicle body 2 is provided with an engine room 3 for accommodating a power unit consisting of an engine 5. The power unit may also consist of a motor or a motor generator when the vehicle consists of a hybrid vehicle or an electric vehicle. A passenger compartment 4 is provided behind the engine room 3, and a rear bulkhead 15 separates the passenger compartment 4 from the engine room 3. The engine 5 is mounted in the engine room 3 with a rightward offset, and has a crankshaft axial line directed laterally. A transmission 6 is connected to the left end of the engine 5. A steering column 7 positioned on the right hand side of the passenger compartment 4 and connected to a steering device not shown in the drawing for steering the front wheels is also shown in FIG. 1.

The vehicle body 2 includes a pair of side frames 11 extending in the fore and aft direction on either side of the vehicle body 2 inward of the front wheels, and a pair of upper members 12 also extending in the fore and aft direction outward of the side frames 11. The upper members 12 are slanted downward toward the front ends thereof. The front ends of the side frames 11 and the upper members 12 are commonly connected to a laterally extending front bulkhead 13 which includes a bumper beam. A front damper housing 14 for supporting the upper end of a strut suspension system is provided between each front side frame 11 and the associated upper member 12. The lateral ends of the rear bulkhead 15 are connected to the respective front side frames 11 and upper members 12.

The engine room 3 is thus defined by the front side frames 11, the upper members 12, the front damper housings 14, the front bulkhead 13 and the rear bulkhead 15.

The brake system 20 consists of a brake by wire brake system that includes an input device 21 via which the vehicle operator can apply a brake input to the brake system 20 and a motor driven brake cylinder 22 (electric brake actuator) for producing a brake hydraulic pressure corresponding to an electric signal which is mainly based on the brake input. The input device 21 includes a main body which is similar to a conventional master cylinder, and made of metallic material. The brake system 20 is further provided with a VSA device 23 (vehicle stability assist device) incorporated with a ABS for preventing the wheels from locking during braking, a TCS (traction control system) for preventing the slipping of the front wheels during acceleration, a device for yaw moment control during cornering, a device for brake assist functions, a device for crash prevention and a device for lane keeping, for performing various automatic brake functions.

The input device 21, the motor driven brake cylinder 22 and the VSA device 23 are positioned in different parts of the engine room 3. The input device 21 is mounted on and extends through a right hand side of the rear bulkhead 15. The motor driven brake cylinder 22 is attached to the front side of a left hand side of the rear bulkhead 15. The VSA device 23 is mounted on the front right side part of the engine room 3, in front of the right front damper housing 14. By thus arranging the input device 21, the motor driven brake cylinder 22 and the VSA device 23 in different parts of the engine room 3, a high level of freedom is attained in positioning the various components of the brake system 20.

The brake system 20 is able to control the brake force independently from the brake input to the input device 21 by the vehicle operator, and the motor driven brake cylinder 22 and the VSA device 23 are connected to one another via a hydraulic circuit so that a fails safe and other safety features may be automatically performed by the brake system 20.

The brake system 20 is now described in the following with reference to FIG. 2.

In addition to the input device 21, the motor driven brake cylinder 22 and the VSA device 23, the brake system 20 includes four disk brake devices 24 each including a brake disk 24a fixed to the corresponding wheel, and a wheel cylinder 24b for pressing a brake pad against the brake disk 24a.

The input device 21 includes a master cylinder 31, a first piston 31b received in a cylinder main body 31a and a brake pedal 32 having an upper end pivotally supported by the rear bulkhead 15 via a bracket and connected to the first piston 31b via a rod 33. The brake pedal 32 is located in the passenger compartment 4, and undergoes a swinging motion around the upper end thereof when pushed down by the vehicle operator. The brake pedal stroke detected by a pedal stroke sensor 32a is forwarded to a control unit (not shown in the drawings) which causes a corresponding brake hydraulic pressure to be produced by appropriately driving the motor driven brake cylinder 22 in dependence on the applied brake input.

The rod 33 is connected to both the brake pedal 32 and the first piston 31b such that the swinging movement of the brake pedal 32 may be converted into the corresponding linear movement of the first piston 31b. The end of the rod 33 connected to the first piston 31b is covered by a boot 34 fitted onto the master cylinder main body 31a. A second piston 31c which is connected to the side of the first piston 31b facing away from the rod 33 is received in the master cylinder main body 31a on the side of the first piston 31b facing away from the rod 33, and a compression coil spring is interposed between the first piston 31b and the second piston 31c. Another compression coil spring is interposed between the side of the second piston 31c facing away from the first piston 31b and the opposing bottom wall of the master cylinder main body 31a. Therefore, both of the first piston 31b and the second piston 31c are normally urged toward the rod 33. The brake pedal 32 is also biased (in a counterclockwise direction in FIG. 2) by a spring member not shown in the drawings such that the first piston 31b is in the rightmost position in FIG. 2 when the brake pedal 32 is released.

The master cylinder 31 is provided with a reservoir tank 35 for making up for any shortage of the brake fluid that may be caused by the displacement of the pistons 31b and 31c. The pistons 31b and 31c are fitted with per se known seal members that close oil passages 36a and 36b communicating the interior of the cylinder main body 31a with the reservoir tank 35 when required. Inside the cylinder main body 31a, a first fluid chamber 37a is defined between the first piston 31b and the second piston 31c, and a second fluid chamber 37b is defined between the second piston 31c and the end wall of the cylinder main body 31a facing away from the first piston 31b.

The motor driven brake cylinder 22 includes an electric servomotor 41, and a brake cylinder 42 configured to be driven by the electric servomotor 41 to produce a hydraulic brake pressure. The electric servomotor 41 is mounted to a housing 42a of the brake cylinder 42 serving also as a gear box. The brake cylinder 42 is provided with a screw rod 43 configured to be displaced in the axial direction by turning a ball nut threaded onto the screw rod 43 with the electric servomotor 41, and a first piston 42b and a second piston 42c which are arranged in tandem with and coaxial with the screw rod 43.

An end of a connecting member 44 is fixedly attached to the second piston 42c, and the other end of the connecting member 44 extending from the second piston 42c is connected to the first piston 42b in an axially moveable manner by a certain stroke. A compression coil spring 27a is interposed between the first piston 42b and the second piston 42c, and another compression coil spring 27b is interposed between the second piston 42c and the end wall of the brake cylinder 42 remote from the first piston 42b. Therefore, the first piston 42b and the second piston 42c are relatively moveable in the axial direction by the prescribed stroke.

Inside the brake cylinder 42, a first fluid pressure chamber 47a is defined between the first piston 42b and the second piston 42c, and a second fluid pressure chamber 47b is defined between the second piston 42b and the opposing end wall of the brake cylinder 42. A pair of oil passages 46a and 46b extending from different parts of the brake cylinder 42 are commonly connected to a communication passage 46 extending to the reservoir tank 35. The pistons 42b and 42c are fitted with per se known seal members that close oil passages 46a and 46b communicating the interior of the brake cylinder 42 with the reservoir tank 35 when required.

The first fluid chamber 37a of the master cylinder 31 is communicated with the first fluid pressure chamber 47a of the brake cylinder 42 via a normally open first solenoid valve 48a, and the second fluid chamber 37b is communicated with the second fluid pressure chamber 47b of the brake cylinder 47 via a normally open second solenoid valve 48b. A first brake pressure sensor 49a is provided in the part of the oil passage extending between the first fluid chamber 37a and the first solenoid valve 48a for detecting the master cylinder fluid pressure generated by the master cylinder 31, and a second brake pressure sensor 49b is provided in the part of the oil passage extending between the second solenoid valve 48b and the second fluid pressure chamber 47b for detecting the actual brake pressure generated by the brake cylinder 42.

A cylinder type simulator 50 is connected to a part of the oil passage extending between the second fluid chamber 37b and the second solenoid valve 48b via a normally closed third solenoid valve 48c. The simulator 50 includes a housing 50a in the form of a cylinder and a piston 50b slidably received in the housing 50a so as to separate the interior of the housing 50a into two chambers. Inside the housing 50a, an oil storage chamber 51 is defined in one of the chambers in the housing 50a communicating with the oil passage leading to the normally closed third solenoid valve 48c, and a compression coil spring 52 is received in the chamber remote from the normally closed third solenoid valve 48c. The latter chamber is communicated with the atmosphere. Thus, when the first solenoid valve 48a and the second solenoid valve 48b are closed, and the third solenoid valve 48c is open, depressing the brake pedal 32 causes the brake fluid in the second fluid chamber 37b to be pushed into the oil storage chamber 51. As a result, the biasing force of the compression coil spring 52 is transmitted to the brake pedal 32 so that a reaction force is produced in the brake pedal 32 in a similar manner as when depressing a brake pedal of a conventional brake system where the master cylinder 31 and the wheel cylinders 24b are directly connected to each other.

Figure 2:
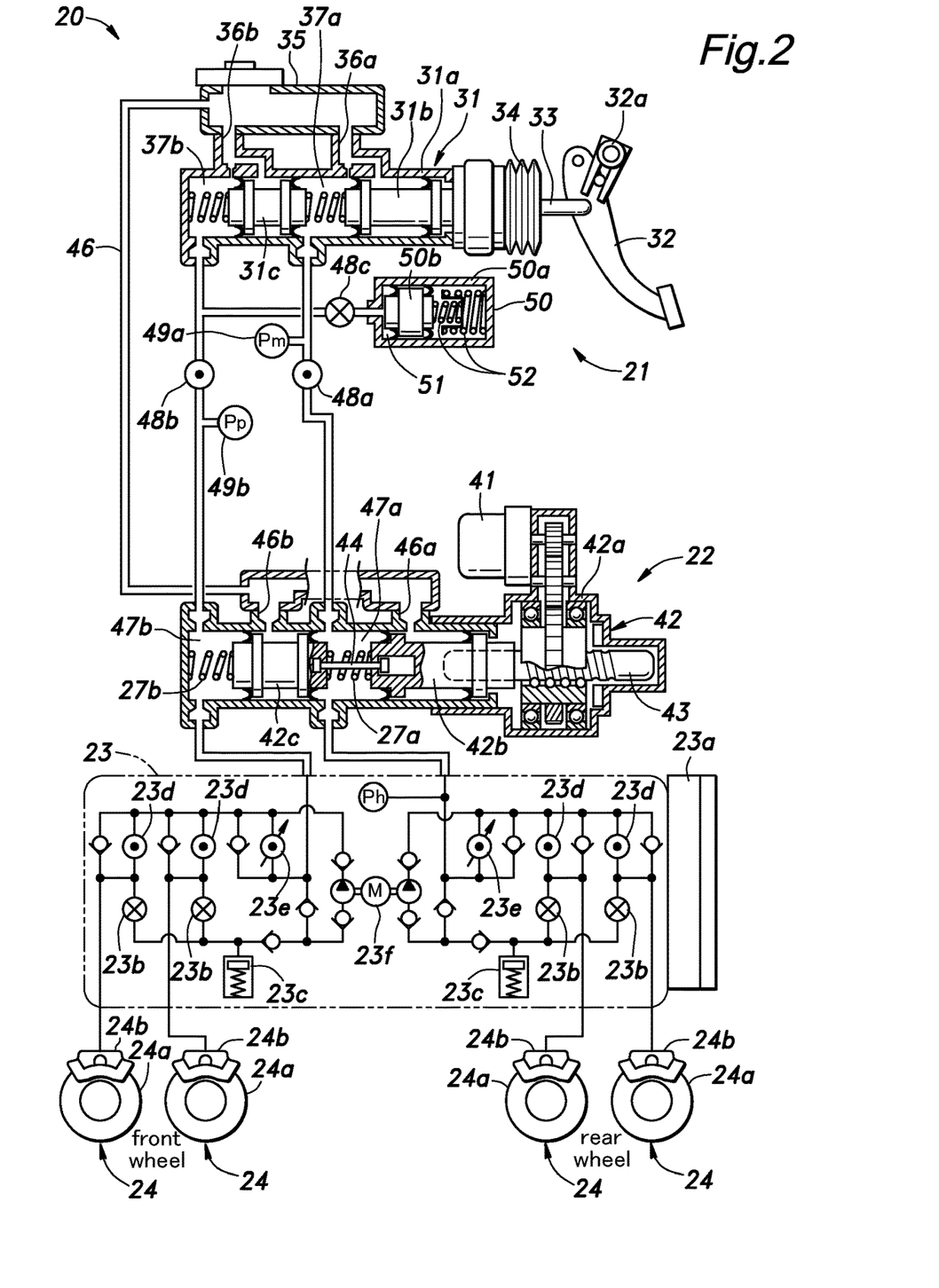
FIG. 2 is a hydraulic circuit diagram of the vehicle brake system shown in FIG. 1.

In FIG. 2, the simulator 50 is represented as an independent mechanism that is positioned between the master cylinder 31 and the brake cylinder 42, but in the illustrated embodiment, the housing 50a of the simulator 50 is a part of a single integral metallic cast member serving as the housing 31a of the master cylinder 31.

The first fluid pressure chamber 47a and the second fluid pressure chamber 47b of the brake cylinder 42 are communicated with a plurality (four, in the illustrated embodiment) of wheel cylinders 24b via the VSA device 23.

The VSA device 23 may have a per se known structure, and includes a first system corresponding to the front wheel cylinder 24b and a second system corresponding to the rear wheel cylinders 24b, and each system includes a pair of normally closed, out valves 23b (depressurization valve), a low pressure reservoir 23c, a pair of normally open, in valves 23d and a regulator valve 23e. The VSA device 23 further includes a motor powered pump unit 23f and other hydraulic component parts as well as a VSA control unit 23a which are provided commonly for the two systems.

Sensor signals from various sensors (not shown in the drawings) for detecting the behavior of the vehicle 1 as well as the sensor signals from the pedal stroke sensor 32a and the two brake pressure sensors 49a and 48b are supplied to the VSA control unit 23a. Based on the sensor signals from these sensors, the VSA control unit 23a drives the motor driven brake cylinder 22 so that the frictional brake force produced by each disk brake 24 may be appropriately adjusted.

The mode of control action during a normal braking operation is discussed in the following. FIG. 2 shows the state where the brake pedal 32 is not depressed. When the pedal stroke sensor 32a detects an initial value of zero, essentially no brake pressure signal is produced from the control unit. At this time, as shown in FIG. 2, the screw rod 43 of the motor driven brake cylinder 22 is in the most retreated position so that the two pistons 42b and 42c are also placed in the respective most retreated position under the spring force of the compression coil springs 45a and 45b, and no brake pressure is produced in the two fluid pressure chambers 47a and 47b.

When the brake pedal 32 is depressed, and the detection value of the pedal stroke sensor 32a becomes greater than zero, the control unit closes the first and second solenoid valves 48a and 48b so that the fluid pressure produced in the master cylinder 31 is prevented from reaching the brake cylinder 42, and opens the third solenoid valve 48c to permit the fluid pressure produced in the master cylinder 31 to reach the simulator 50. At the same time, the target brake fluid pressure for the motor driven brake cylinder 22 is determined according to the brake pedal stroke detected by the pedal stroke sensor 32a, and a target current correspond to the target brake fluid pressure is supplied from the control unit to the electric servomotor 41. As a result, the screw rod 43 and the first piston 42b are pushed inward in the motor driven brake cylinder 22, and a brake fluid pressure corresponding to the input or the brake pedal stroke is produced in the first fluid pressure chamber 47a. At the same time, the second piston 42c is pushed by the fluid pressure of the first fluid pressure chamber 47a so that the second piston 42c is displaced in the inward direction against the biasing force of the compression coil spring 45b, and a brake fluid of the same magnitude is produced in the second fluid pressure chamber 47b.

When the brake pedal 32 is released, the electric servomotor 41 pulls back the screw rod 43 and the first piston 42b toward the respective initial positions so that the brake fluid pressure is reduced depending on how far the brake pedal 32 is released. Once the brake pedal 32 is fully released under the spring force of the return spring for the brake pedal 32 not shown in the drawings, the control unit opens the first and second solenoid valves 48a and 48b so that the brake fluid in the wheel cylinders 24b is returned to the reservoir tank 35 via the motor driven brake cylinder 22, and the brake force is removed. Once the detection value of the pedal stroke sensor 32a has returned to the initial value, the first piston 42b returns to the initial position thereof, and the second piston 42 is also pulled back to the initial position thereof by the first piston 42b via the connecting member 44.

When the VSA device 23 is not operating, the brake fluid pressure produced by the motor driven brake cylinder 22 is evenly distributed to the wheel cylinders 24b of the front and rear wheels. When the VSA device 23 is operating, the brake fluid pressure is distributed to the wheel cylinders 24b such that the wheels may receive mutually different braking forces as required. When the VSA device 23 produces an auxiliary brake fluid pressure, independently from the brake fluid pressure produced by the motor driven brake cylinder 22, in the part of the hydraulic circuit downstream of the motor driven brake cylinder 22 by using the motor powered pump unit 23f, the pressurized brake fluid is supplied to the wheel cylinders 24b via the in valves 23d when the brake pressure is to be increased, and is expelled to a low pressure reservoirs 23c via the out valves 23b when the brake pressure is to be decreased.

Figure 3:
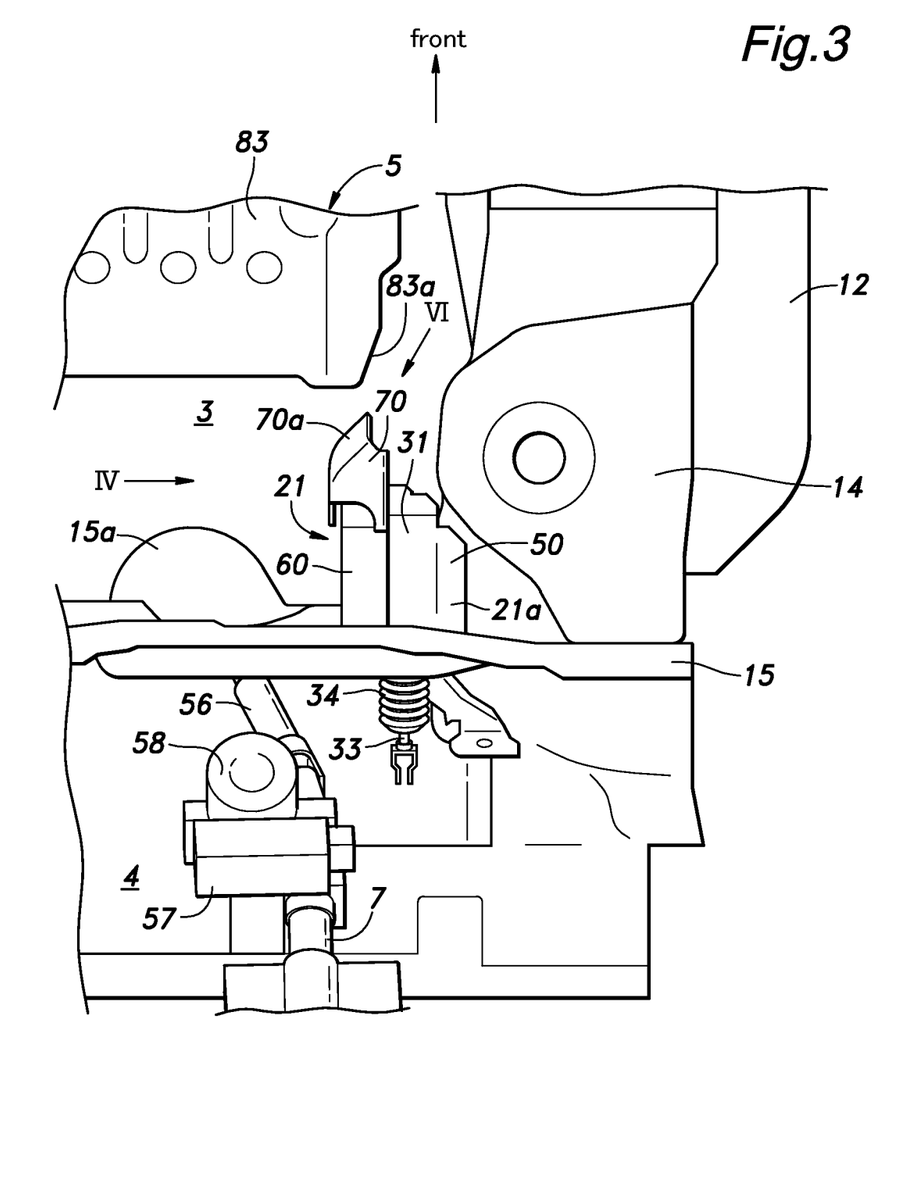
FIG. 3 is an enlarged plan view of the input device and the surrounding part shown in FIG. 1.

FIG. 3 is an enlarged plan view of the input device 21 and the surrounding part. A lower part of the rear bulkhead 15 is formed with a bulge 15a projecting forward with a downward and a leftward slant. The lower end of the bulge 15a is formed with an opening not shown in the drawing for passing through a lower joint shaft 56 which is connected to the lower end of the steering column 7 located in the passenger compartment 4 via a joint and extending into the engine room 3. The lower end of the lower joint shaft 56 extends in a forward and leftward direction into the engine room 3. The lowermost part of the lower joint shaft 56 located in the engine room 3 is formed with a pinion that meshes with a rack received in a steering gear box not shown in the drawing. The steering column 7 is fitted with an electric power steering (EPS) system. An EPS control unit 57 and an electric motor 58 forming the electric power steering system are attached to steering column 7. The electric motor 68 applies a steering assist torque to the steering column 7 under the control of the EPS control unit 57.

The input device 21 combines the master cylinder 31 located in a laterally central part of the input device 21 and the simulator 50 located on the right hand side thereof, and is attached to the rear bulkhead 15 so as to project forward from the front surface of the rear bulkhead 15. The input device 21 is integrally provided with the sensor unit 60 located on the left hand side of the master cylinder 31. In the illustrated embodiment, the master cylinder 31 and the simulator 50 are incorporated in a housing 21a made of cast metallic material.

As shown in FIG. 2, the sensor unit 60 includes the two brake pressure sensors 49a and 49b, an electronic circuit board (not shown in the drawing) supporting a circuit for processing the pressure detection signals from the brake pressure sensors 49a and 49b, and the first to the third solenoid valves 48a, 48b and 48c. The sensor unit 60 is received in a box made of plastic material and attached to the housing 21a with screws.

A front part of the input device 21 is fitted with a protective member 70 defining a slanted surface 70a facing a forward and leftward direction and covering a front side and a left side of the sensor unit 60. In other words, the slanted surface 70a slants rearward as one moves leftward. The input device 21 is positioned laterally to the right of the steering column 7 in a laterally overlapping relationship with the engine 5. The protective member 70 is located behind the engine 5 so that a certain gap is created between the engine 5 and the protective member 70.

Figure 4:
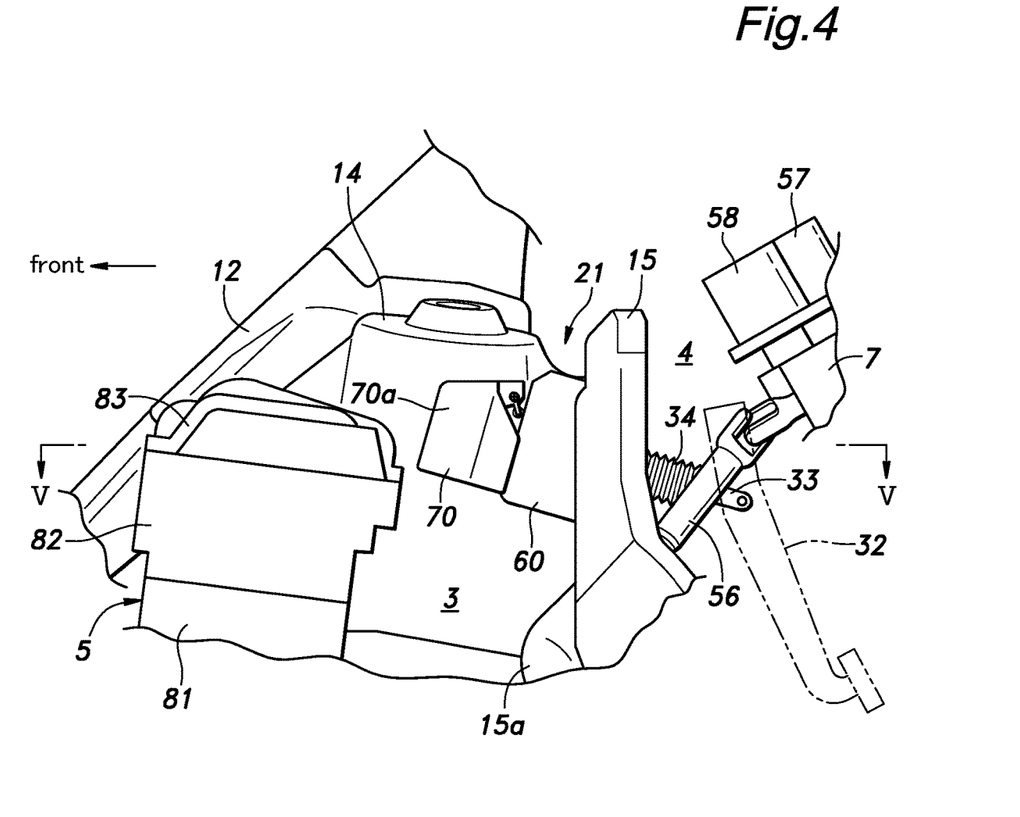
FIG. 4 is an enlarged fragmentary side view of the input device and the surrounding part.

FIG. 4 is a side view of the input device 21 and the surrounding part as seen from the direction indicated by arrow IV in FIG. 3. The engine 5 is provided with a cylinder block 81, a cylinder head 82 connected to the upper surface of the cylinder block 81, a head cover 83 connected to the upper surface of the cylinder head 82 and an oil pan (not shown in the drawing) connected to the lower surface of the cylinder block 81, and is mounted in the engine room 3 laterally with a rearward slant. The input device 21 overlaps with the engine 5, in particular with the head cover 83 and an upper part of the cylinder head 82, as seen in front view.

Figure 5:
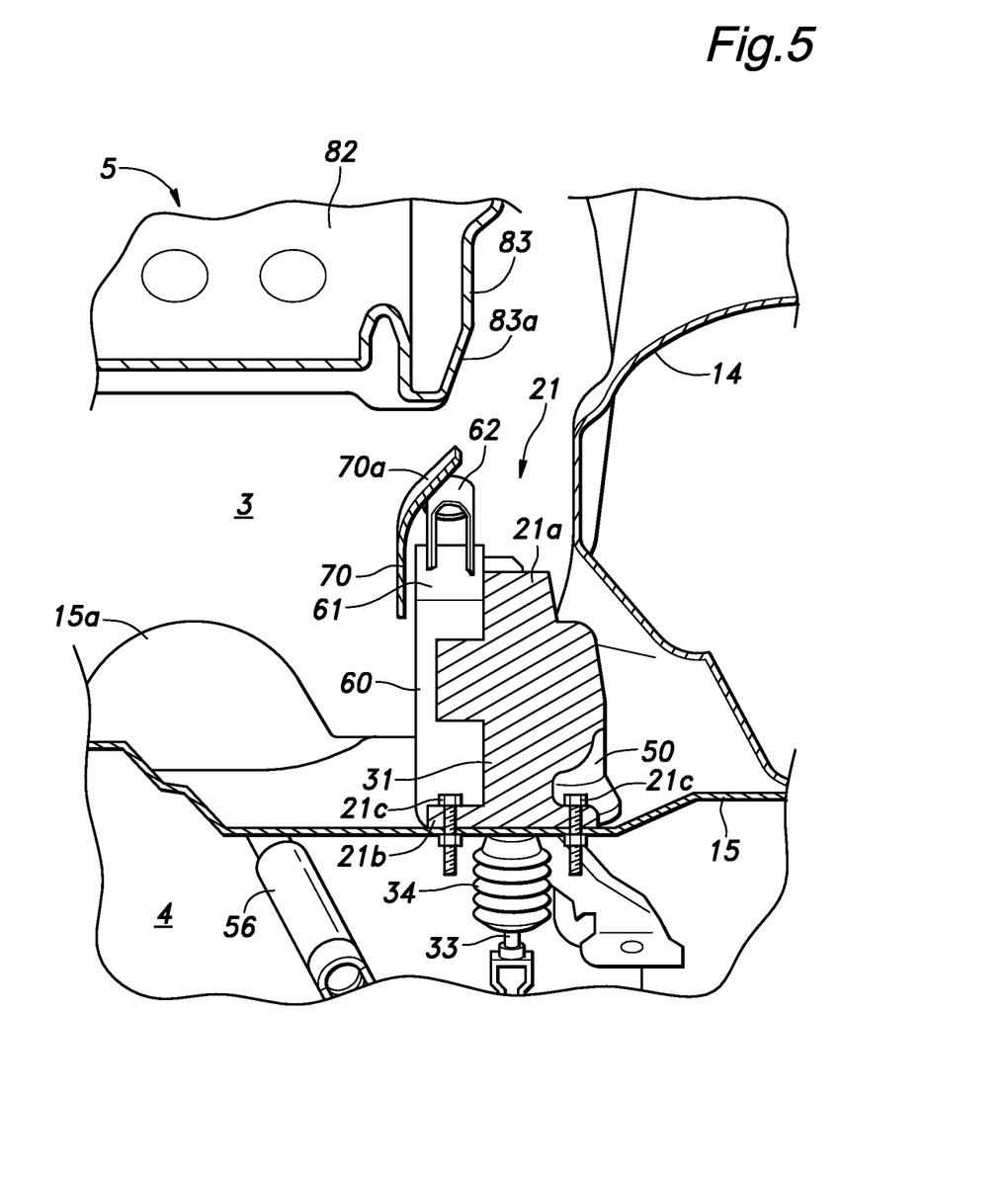
FIG. 5 is a sectional view taken along line V-V of FIG. 4.

FIG. 5 is a sectional view taken along line V-V of FIG. 4. A mounting flange 21b is integrally formed in a rear part of the housing 21a of the input device 21. The mounting flange 21b is fixedly secured to the rear bulkhead 15 by a pair of fasteners 21c (such as bolts and nuts) such that the rod 33 projects into the passenger compartment 4. The fasteners 21c are positioned on either lateral side of the rod 33. The end of the rod 33 extending into the passenger compartment 4 is fitted with a boot 34 in a per se known manner.

The front end of the sensor unit 60 is provided with a connector 61 which is connected to a wire harness not shown in the drawings via a harness coupler 62. The protective member 70 covers the connector 61 and the harness coupler 62. In other words, the connector 61 and the harness coupler 62 are positioned between the protective member 70 and the housing 21a of the input device 21. Also, the connector 61 and the harness coupler 62 are positioned behind the protective member 70.

A corner part of the head cover 83 defined by the right end surface (extending in the fore and aft direction) and a rear end surface (extending laterally) thereof is formed with a slanted surface 83a which slants forward as one moves rightward. The rear end of the slanted surface 83a of the head cover 83 substantially aligns with a front (right hand) part of the slanted surface 70a of the protective member 70. The slanted surface 83a on the side of the engine 5 is provided on the head cover 83 in the illustrated embodiment, but may also be provided on a part of the cylinder head or the cylinder block of the engine depending on which part of the engine 5 aligns with the input device 21 in front view.

Figure 6:
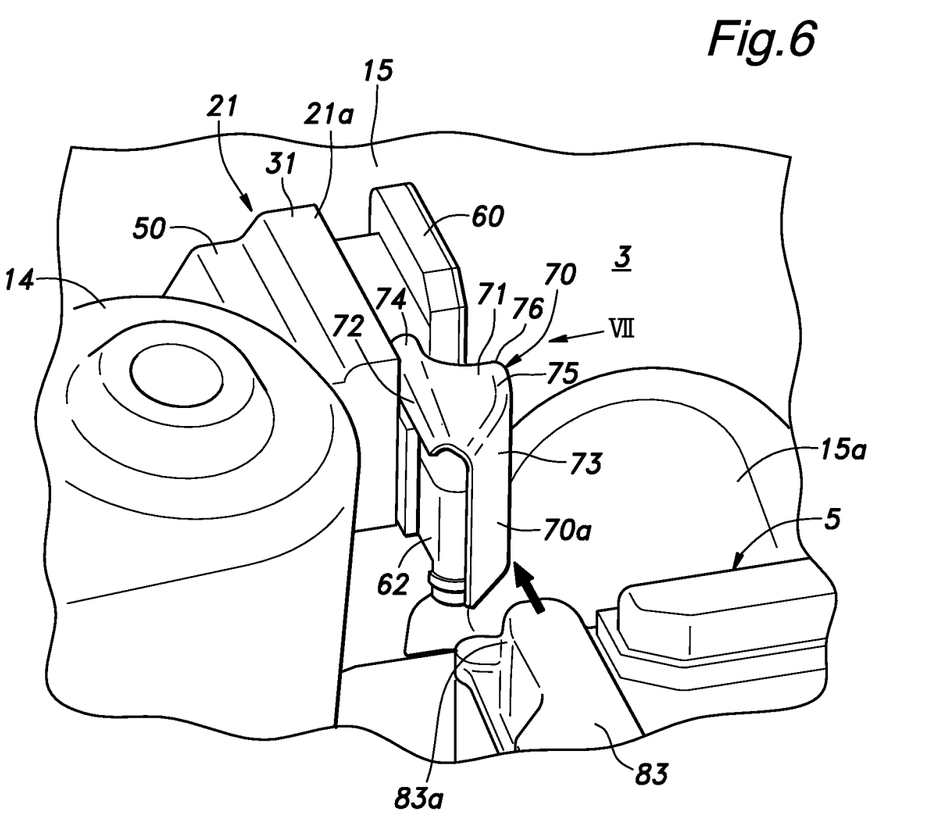
FIG. 6 is a perspective view of the brake system and the surrounding part as seen from direction VI shown in FIG. 3.

FIG. 6 is a perspective view of the brake system and the surrounding part as seen from direction VI shown in FIG. 3. The protective member 70 consists of a stamp formed steel sheet metal, and is fixedly attached to the housing 21a of the input device 21. The protective member 70 is thus formed separately from the housing 21a of the input device 21, and includes a right vertical wall 72 extending vertically in the fore and aft direction, an upper horizontal wall 71 extending laterally from an upper edge of the right vertical wall 72 away from the housing 21a of the input device 21, and a left vertical wall 73 extending downward from a lateral edge of the upper horizontal wall 71 remote from the right vertical wall 72. The right vertical wall 72 has a substantially smaller vertical dimension that the left vertical wall 73.

The upper edge of the right vertical wall 72 thus defines a right ridge line 74 that extends linearly substantially in the fore and aft direction, but the upper edge of the left vertical wall 73 includes a front part which is angled away for the right vertical wall toward the rear end thereof and a rear part which is less angled (or extends substantially in the fore and aft direction) so that a substantially horizontal, bent ridge line 75 is defined between the upper horizontal wall 71 and the left vertical wall 73. Also a vertical ridge line 80 (which may be rounded) is created between a front part and a rear part of the left vertical wall 73. In other words, the upper horizontal wall 71 includes a front part that is tapered and a rear part that is substantially less tapered than the front part.

Figure 7:
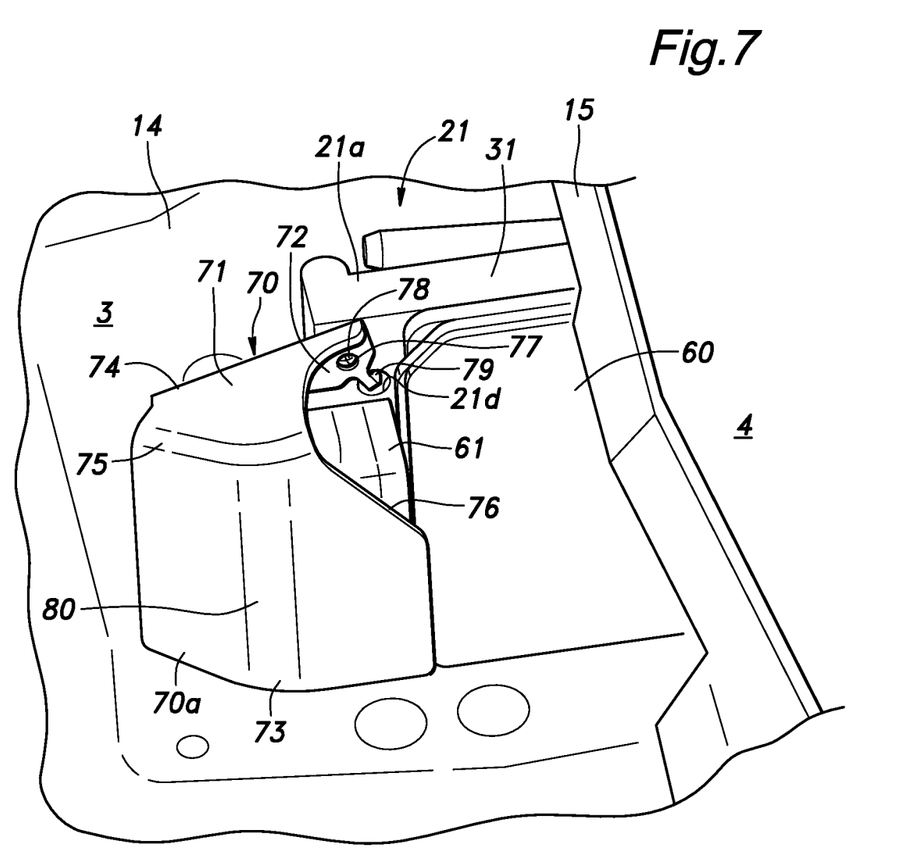
FIG. 7 is a perspective view of the brake system and the surrounding part as seen from direction VII shown in FIG. 6.

FIG. 7 which is a perspective view of the brake system and the surrounding part as seen from direction VII shown in FIG. 6. As shown in FIG. 7, a rear end part of the right vertical wall 72 is formed with a hole 77 for passing through a fastener 78 such as a threaded bolt for securing the protective member 70 to the housing 21a of the input device 21. A lower rear corner of the right vertical wall 72 is formed with a tongue 79 which is bent into a recess 21d formed in the housing 21a of the input device 21. Thus, the protective member 70 is fixedly secured to the housing 21a of the input device 21 even though only one fastener 78 is employed because the tongue 79 prevents the rotation of the protective member 70 around the center line of the fastener 78. The rear end of a corner part between the upper horizontal wall 71 and the left vertical wall 73 is provided with a cutout 76 for affording access to the fastener 78.

The mode of operation of the brake system 20 is described in the following with reference to FIGS. 8a and 8b.

Figure 8A:
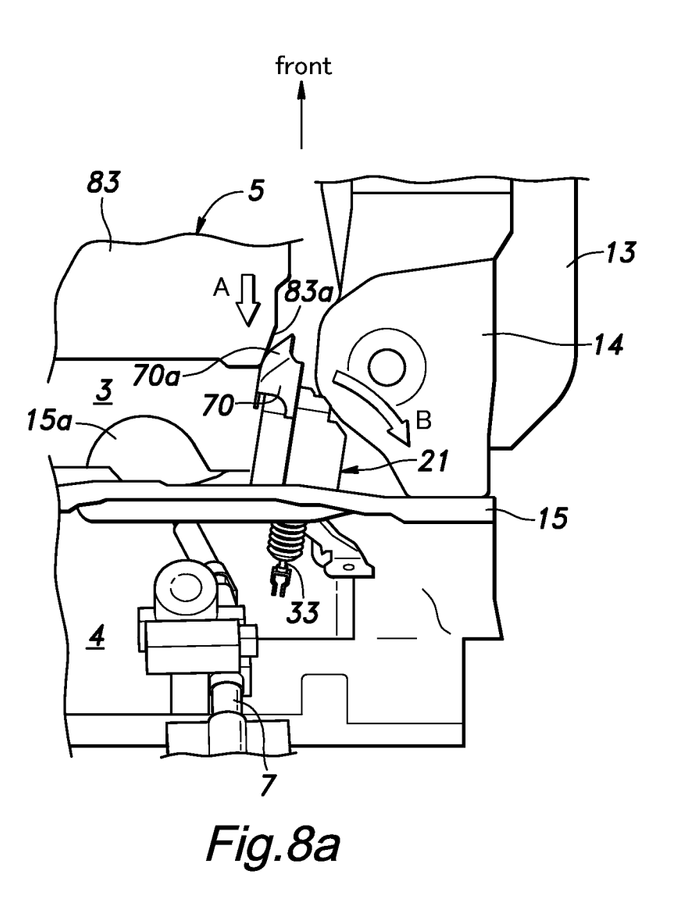
FIGS. 8a and 8b are plan views of the brake system and the surrounding part in the normal assembled state, and following a crash, respectively.
Figure 8B:
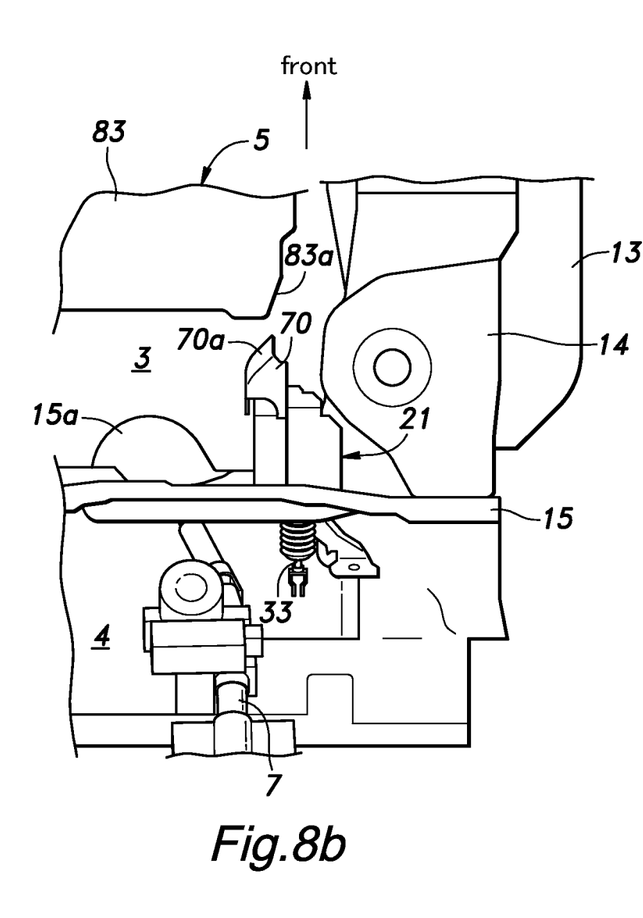

FIG. 8a is a plan view of the brake system and the surrounding part in the normal assembled state, and FIG. 8b is a similar plan view when the engine 5 has moved rearward and collided with the input device 21 owing to a frontal crash.

As shown in FIG. 8a, the slanted surface 70a of the protective member 70 opposes the corresponding slanted surface 83a of the head cover 83 of the engine 5.

When the engine 5 moves rearward (as indicated by arrow A) owing to a frontal crash, the corresponding slanted surface 83a of the head cover 83 abuts the slanted surface 70a of the protective member 70 so that the input device 21 receives a lateral component of the force that is applied to the protective member 70 from the engine 5. As a result, the input device 21 is forced to rotate in the clockwise direction (in plan view) in FIG. 8b (as indicated by arrow B) because the input device 21 is attached to the rear bulkhead 15 via the mounting flange 21b of the housing 21a of the input device 21. Ultimately, the input device 21, in particular the housing 21a thereof, abuts the adjoining part of the vehicle body or the front damper housing 14 in this case. Therefore, the input device 21 is wedged between the engine 5 and the vehicle body so that the input device 21 is effectively prevented from being pushed into the passenger compartment 4 at the time of a frontal crash.

In the illustrated embodiment, the slanted surfaces 70a and 83a are arranged such that the input device 21 is caused to tilt sideways so that the input device 21 is effectively prevented from intruding into the passenger compartment 4 at the time of a frontal crash.

In the illustrated embodiment, the slanted surfaces 70a and 83a are arranged such that the input device 21 is caused to tilt sideways so that the risk of the displaced input device 21 interfering with the steering column 7 in the passenger compartment 4 can be minimized.

The rearward movement of the input device 21 may also be minimized by reinforcing the rear bulkhead 15, but this causes an increase in the material cost and an increase in the weight of the vehicle body.

Because the engine side slanted surface 83a opposes the input device side slanted surface 70a as shown in FIGS. 5 and 8, the two slanted surfaces 70a and 83a abut one another as a surface contact when the engine 5 moves rearward as a result of a frontal crash so that the protective member 70 does not receive any localized stress. Therefore, at the time of a crash, the protective member 70 is enabled to perform the function thereof without being damaged.

The protective member 70 consists of a member separate from the housing 21a of the input device 21, and is attached to the housing 21a by using the fastener in the illustrated embodiment. Therefore, the present invention can be applied to the existing input device 21 without requiring any substantial changes to be made.

In the illustrated embodiment, as shown in FIG. 7, the protective member 70 is attached to the housing 21a of the input device 21 by using the tongue 79 in combination with the fastener 78 so that the protective member 70 can be securely fixed against rotation even though the assembling work requires only the fastening of the single fastener 78. Therefore, the protective member 70 can be secured to the input device 21 with an adequate mechanical strength with a minimum amount of labor.

Even though the protective member 70 is channel shaped or otherwise configured to cover a part of the input device 21 in the illustrated embodiment, owing to the provision of the cutout 76 in a rear part of the protective member 70, the access to the fastener 78 can be improved, and this contributes to a high efficiency of the assembly work.

In the illustrated embodiment, because the protective member 70 is channel shaped, and is therefore provided with a pair of ridge lines 74 and 75 extending in the fore and aft direction, a high level of stiffness can be achieved against a frontal impact. This also contributes to a satisfactory performance of the protective member 70 at the time of a frontal crash. Also, the left ridge line 75 is bent in the illustrated embodiment, and the vertical ridge line 80 extending downward from the bent point of the left ridge line 75 is created in the left vertical wall 73. Therefore, the stiffness of the protective member 70 against lateral collapsing can be enhanced while the slanted surface 70a is created in a convenient manner. This also contributes the maintenance of the integrity of the slanted surface 70a at the time of a frontal impact.

In the illustrated embodiment, because the connector 61 is interposed between the slanted surface 70a of the protective member 70 and the housing 21a of the input device 21, the connector 61 is protected from a frontal impact at the time of a frontal crash. If the frontal impact is severe, the connector 61 may absorb a part of the impact so that any undue displacement of the input device 21 can be avoided.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A vehicle brake system comprising an input device attached to a bulkhead separating a power unit room accommodating a power unit of a vehicle and a passenger compartment of the vehicle from each other, the input device including a part extending into the power unit room, wherein:
  a free end of the part of the input device extending into the power unit room is fitted with a protective member defining a slanted surface opposing the power unit and slanting rearward as one moves in a prescribed lateral direction,
  the slanted surface aligns with a corner part of the power unit defined by a side end surface of the power unit extending along a fore and aft direction and a rear end surface extending in the prescribed lateral direction from the side end surface, and
  the corner part of the power unit is provided with a corresponding slanted surface opposing the slanted surface of the protective member.

2. A vehicle brake system comprising an input device attached to a bulkhead separating a power unit room accommodating a power unit of a vehicle and a passenger compartment of the vehicle from each other, the input device including a part extending into the power unit room, wherein:
  a free end of the part of the input device extending into the power unit room is fitted with a protective member defining a slanted surface opposing the power unit and slanting rearward as one moves in a prescribed lateral direction,
  the protective member is made of a separate member which is attached to a main body of the input device, and
  the protective member is made of a plate member including a first vertical wall which is attached to the main body of the input device via a fastener, an upper horizontal wall extending laterally from an upper edge of the first vertical wall away from the main body of the input device, and a second vertical wall extending downward from a lateral edge of the upper horizontal wall remote from the first vertical wall, the slanted surface being formed by at least a part of the second vertical wall.

3. The vehicle brake system according to claim 2, wherein a rear end of corner part between the upper horizontal wall and the second vertical wall is provided with a cutout for affording access to the fastener.

4. The vehicle brake system according to claim 2, wherein the first vertical wall has a substantially smaller vertical dimension than the second vertical wall.

5. The vehicle brake system according to claim 2, wherein an electric component is positioned between the main body of the input device and the protective member or behind the protective member.

6. The vehicle brake system according to claim 5, wherein the vehicle brake system consists of a brake by wire system having a powered brake device positioned in the power unit room separately from the input device, the electric component including an electric circuit for detecting an amount of input applied to the input device.

7. The vehicle brake system according to claim 2, wherein the input device is positioned adjacent to a front damper housing on a lateral side remote from the protective member.

8. The vehicle brake system according to claim 7, wherein the input device is laterally interposed between the front damper housing and a bulging part of the bulkhead bulging toward the power unit room and having an opening for passing through a steering shaft.

9. A vehicle brake system comprising an input device attached to a bulkhead separating a power unit room accommodating a power unit of a vehicle and a passenger compartment of the vehicle from each other, the input device including a part extending into the power unit room, wherein:

a free end of the part of the input device extending into the power unit room is fitted with a protective member defining a slanted surface opposing the power unit and slanting rearward as one moves in a prescribed lateral direction, the protective member is made of a separate member which is attached to a main body of the input device, the protective member is attached to the main body of the input device by a fastener and an engagement feature provided on the protective member in a spaced apart relationship to the fastener and engaging a part of the main body of the input device, and the protective member is made of a plate member including a first vertical wall which is attached to the main body of the input device via the fastener and the engagement feature, an upper horizontal wall extending laterally from an upper edge of the first vertical wall away from the main part of the input device, and a second vertical wall extending downward from a lateral edge of the upper horizontal wall remote from the first vertical wall, the slanted surface being formed by at least a part of the second vertical wall.

10. The vehicle brake system according to claim 9, wherein the upper horizontal wall includes a front part that is tapered and a rear part that is substantially less tapered than the front part so that a substantially horizontal bent ridge line is defined between the upper horizontal wall and the second vertical wall, and a substantially vertical linear ridge line between a front part and a rear part of the second vertical wall.

* * * * *